United States Patent [19]
Park et al.

[11] Patent Number: 5,777,814
[45] Date of Patent: Jul. 7, 1998

[54] APPARATUS FOR PREVENTING PICTURE FLUCTUATION AND CORRECTING PULSE IN VIDEO CASSETTE RECORDER

[75] Inventors: Sung Baek Park; Soo Heun Choi, both of Kyungki-Do, Rep. of Korea

[73] Assignee: Goldstar Co., Ltd., Seoul, Rep. of Korea

[21] Appl. No.: 661,710

[22] Filed: Jun. 11, 1996

Related U.S. Application Data

[63] Continuation of Ser. No. 266,260, Jun. 27, 1994, abandoned.

[30] Foreign Application Priority Data

Jun. 28, 1993 [KR] Rep. of Korea ............... 1993/11842

[51] Int. Cl.[6] ................................... G11B 15/48
[52] U.S. Cl. ........................... 360/73.08; 360/73.05; 386/80; 386/68; 318/612
[58] Field of Search ............... 360/10.3, 73.08, 360/74.5, 69, 73.05, 10.1, 10.02; 318/603, 611, 612; 386/68, 78, 80

[56] References Cited

U.S. PATENT DOCUMENTS

| | | | |
|---|---|---|---|
| 3,282,098 | 11/1966 | Okba et al. | 360/10.3 |
| 3,895,277 | 7/1975 | Klumpp | 318/269 |
| 4,399,473 | 8/1983 | Kaimai et al. | 360/10.3 |
| 4,604,656 | 8/1986 | Fujii | 360/10.3 |
| 4,649,439 | 3/1987 | Tanaka | |
| 4,649,939 | 3/1987 | Tanaka | 360/10.3 |
| 4,665,449 | 5/1987 | Kozuki et al. | 360/10.3 |

*Primary Examiner*—Aristotelis M. Psitos
*Assistant Examiner*—Larry T. Cullen

[57] ABSTRACT

An apparatus for preventing a picture fluctuation and correcting a reverse pulse in a servo system for a video cassette recorder having a still or slow motion playback function. The apparatus comprises speed and phase error detectors for detecting speed and phase errors, speed and phase controllers for controlling a speed and a phase in response to output signals from the speed and phase error detectors, mixers for mixing output signals from the speed and phase controllers, a system control circuit for controlling an operation of the servo system, the system control circuit including a correction circuit for varying widths or edges of correction signals in response to speed and phase information, and drivers for driving motors of the servo system in response to the correction signals.

18 Claims, 5 Drawing Sheets

FIG.2A PRIOR ART    SW30Hz

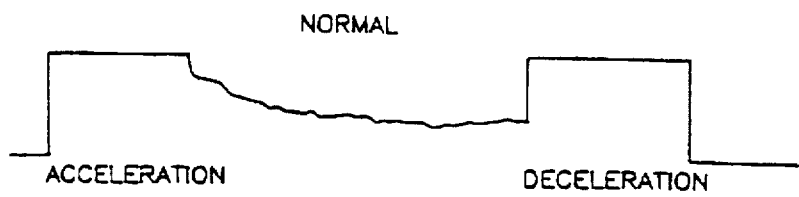
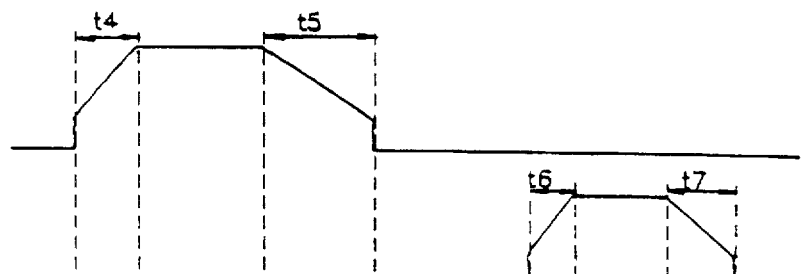
FIG.7A
FIG.7B
FIG.7C
FIG.7D
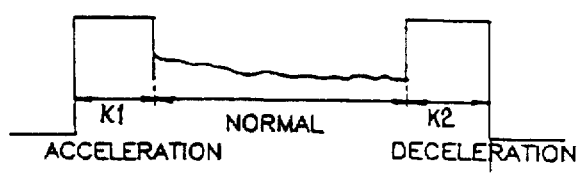
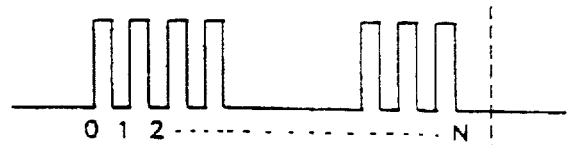
FIG.8A
FIG.8B
FIG.8C

APPARATUS FOR PREVENTING PICTURE FLUCTUATION AND CORRECTING PULSE IN VIDEO CASSETTE RECORDER

This application is a continuation, of application Ser. No. 08/266,260 filed on Jun. 27, 1994, now abandoned.

BACKGROUND OF THE INVENTION

1. Field of the Invention

The present invention relates in general to an apparatus for preventing a picture fluctuation and correcting a reverse pulse in a video cassette recorder (VCR), and more particularly to such an apparatus in which the picture fluctuation is prevented and a noise is removed in a slow motion playback mode.

2. Description of the Prior Art

Referring to FIG. 1, there is shown a block diagram of a conventional apparatus for preventing a picture fluctuation and correcting a reverse pulse in a VCR. As shown in this drawing, the conventional apparatus comprises a drum servo circuit 100, a capstan servo circuit 200 and a control circuit 300.

The drum servo circuit 100 includes a head drum 101, an FG pulse generator 102 for generating a plurality of frequency generator (FG) pulses whenever the head drum 101 is rotated once, a rotation detector 103 for detecting the generated FG pulses from the FG pulse generator 102, a drum speed controller 104 for obtaining a speed error amount by comparing each of the detected FG pulses from the rotation detector 103 with a reference signal, converting the obtained speed error amount into a pulse width modulation (PWM) signal, converting the converted PWM signal into a direct current (DC) signal and outputting the resultant signal to a mixer 107, a PG signal generator 111 for generating a pulse generator (PG) signal whenever the head drum 101 is rotated once, and a drum phase detector 105 for detecting the generated PG signal from the PG signal generator 111.

A drum phase controller 106 is adapted to obtain a phase error amount by comparing the detected PG signal from the drum phase detector 105 with a reference signal, converting the obtained phase error amount into a PWM signal, converting the converted PWM signal into a DC signal and outputting the resultant signal to the mixer 107.

The mixer 107 acts to mix an output signal from the drum speed controller 104 with an output signal from the drum phase controller 106.

Also, the drum servo circuit 100 includes an impedance matching unit 108 for matching an impedance of an output signal from the mixer 107 with that of an output signal from the control circuit 300, and a drum motor driver 109 for outputting a motor drive signal to a drum motor 110 in response to an output signal from the impedance matching unit 108.

The drum motor 110 acts to drive the head drum 101 in response to the motor drive signal from the drum motor driver 109.

The capstan servo circuit 200 includes a capstan motor 201, a capstan speed detector 202 for detecting a plurality of FG pulses, each generated whenever the capstan motor 201 is rotated once, a capstan speed controller 203 for obtaining a speed error amount by comparing each of the detected FG pulses from the capstan speed detector 202 with a reference signal, converting the obtained speed error amount into a PWM signal, converting the converted PWM signal into a DC signal and outputting the resultant signal to a mixer 206, and a capstan phase detector 204 for detecting a PG signal generated whenever the capstan motor 201 is rotated once.

A capstan phase controller 205 is adapted to obtain a phase error amount by comparing the detected PG signal from the capstan phase detector 204 with a reference signal, convert the obtained phase error amount into a PWM signal, convert the converted PWM signal into a DC signal and output the resultant signal to the mixer 206.

The mixer 206 acts to mix an output signal from the capstan speed controller 203 with an output signal from the capstan phase controller 205.

Also, the capstan servo circuit 200 includes an impedance matching unit 207 for matching an impedance of an output signal from the mixer 206 with that of an output signal from the control circuit 300, and a capstan motor driver 208 for outputting a motor drive signal to the capstan motor 201 in response to an output signal from the impedance matching unit 207.

The control circuit 300 is constructed to output correction signals to the drum servo circuit 100 and the capstan servo circuit 200, respectively, in response to a reference signal of 30 Hz and the PG signal generated by the capstan motor 201.

The operation of the conventional apparatus for preventing the picture fluctuation and correcting the reverse pulse in the VCR with the above-mentioned construction will hereinafter be described with reference to FIGS. 2A to 2E, which are timing diagrams illustrating a picture fluctuation prevention operation of the conventional apparatus of FIG. 1.

In a slow motion playback mode, generally, a magnetic tape is travelled at a speed lower than a normal speed, thereby causing a video signal recorded thereon to be played back at a speed lower than that of a normal speed playback mode. Here, it should be noted that a noise may be produced in the played-back picture. To solve this problem, the playback operation is repeatedly performed in such a manner as still playback mode→normal speed playback mode→still playback mode→normal speed playback mode. To this end, the capstan motor 201 is repeatedly rotated in such a manner as acceleration→normal→deceleration.

For the acceleration and deceleration rotations, there is an error in a relative speed between the capstan motor 201 and the drum motor 110. In order to correct such an error in the relative speed between the capstan motor 201 and the drum motor 110, the control circuit 300 outputs drum speed correction pulses as shown in FIGS. 2C and 2D to the impedance matching unit 108 in the drum servo circuit 100. Then, the impedance matching unit 108 matches the impedance of the output signal from the mixer 107 with those of the drum speed correction pulses from the control circuit 300 and outputs the resultant signal as shown in FIG. 2E in which is corrected the error in the relative speed between the capstan motor 201 and the drum motor 110. The output signal from the impedance matching unit 108 is applied to the drum motor driver 109. Here, the drum speed correction pulses as shown in FIGS. 2C and 2D are triggered in response to the reference signal of 30 Hz as shown in FIG. 2A.

However, because the drum speed correction pulses are applied as DC voltages, the error in the relative speed between the capstan motor 201 and the drum motor 110 cannot be perfectly corrected. For this reason, a left and right fluctuation and an upper and lower fluctuation of the picture cannot perfectly be removed.

Also in the slow motion playback mode, a noise may be produced in the picture due to a slip of the capstan motor 201. To suppress such a noise, reverse pulse driving control methods have been proposed. The reverse pulse driving control methods are generally classified into two types, the former using two FG pulses and the latter using one FG pulse. The first reverse pulse driving control method produces a reverse pulse using a phase difference between the two FG pulses. The second reverse pulse driving control method experimentally obtains deviations of the capstan motor 21 and a deck using the one FG pulse to fix the reverse pulse at a constant width. The first reverse pulse driving control method will hereinafter be described with reference to FIG. 3 and FIGS. 4A to 4E. FIG. 3 is a block diagram illustrating the first reverse pulse driving control method and FIGS. 4A to 4E are timing diagrams of signals from components in FIG. 3.

Referring to FIG. 3, the control circuit 300 outputs an accel/slow signal as shown in FIG. 4A to a phase error detector 301 and an adder 302 in the slow motion playback mode. In response to the accel/slow signal from the control circuit 300, the phase error detector 301 detects two speed signals CFG1 and CFG2 as shown in FIGS. 4B and 4C from the capstan motor 201. As seen from FIGS. 4B and 4C, the speed signals CFG1 and CFG2 have a phase difference of 180° with respect to each other. The phase error detector 301 then compares the detected speed signals CFG1 and CFG2 with each other.

The phase error detector 301 detects a phase error as designated by t2 in FIG. 4C as a result of the comparison in a deceleration pulse interval t1 of a capstan control signal as shown in FIG. 4D which is applied from the adder 302 to the capstan motor 201. Upon detecting the phase error t2, the phase error detector 301 makes a high interval of a reverse drive signal to the capstan motor 201 low by a correction amount t3 as shown in FIG. 4E resulting from the phase error detection. Then, the phase error detector 301 applies the resultant signal to the capstan motor 201. As a result, the capstan motor 201 is reversely driven, being adjusted by the detected phase error amount.

On the other hand, in the second reverse pulse driving control method using only one FG pulse, the phase error correction amount t3 as shown in FIG. 4E is experimentally obtained. The reverse drive signal is obtained by fixing the obtained phase error correction amount t3 to a constant value. The obtained reverse drive signal is applied from the control circuit 300 in FIG. 1 to the capstan motor 201. As a result, the reverse driving of the capstan motor 201 is controlled in response to the reverse drive signal from the control circuit 300.

However, the first reverse pulse driving control method has a disadvantage in that the capstan motor outputs the two speed signals, resulting in an increase in the cost. The second reverse pulse driving control method has the disadvantage that it cannot flexibly cope with the motor deviation because the phase error correction amount is fixed.

SUMMARY OF THE INVENTION

Therefore, the present invention has been made in view of the above problems, and it is an object of the present invention to provide an apparatus for preventing a picture fluctuation and correcting a reverse pulse in a VCR, in which an error in a relative speed between a capstan motor and a drum motor is accurately corrected in a slow motion playback mode, so that the picture fluctuation can be prevented, and a stop point due to a slip of the capstan motor is accurately found for the reverse pulse driving control, so that a stable picture can be obtained with no noise.

In accordance with one aspect of the present invention, in a servo system for a video cassette recorder having a still or slow motion playback function, there is provided an apparatus for preventing a picture fluctuation and correcting a reverse pulse, comprising speed and phase error detection means for detecting speed and phase errors; speed and phase control means for controlling a speed and a phase in response to output signals from said speed and phase error detection means; mixing means for mixing output signals from said speed and phase control means; system control means for controlling an operation of the servo system, said system control means including correction means for varying widths or edges of correction signals in response to speed and phase information; and driving means for driving motors of the servo system in response to the correction signals.

In accordance with another aspect of the present invention, in a drum servo system for a video cassette recorder, there is provided an apparatus for preventing a picture fluctuation and correcting a reverse pulse, comprising mixing means for mixing a drum speed control signal and a drum phase control signal; drum motor driving means for driving a drum motor; impedance matching means for matching impedances between said mixing means and said drum motor driving means; system control means for controlling an operation of the drum servo system, said system control means including drum motor control means for generating drum speed correction signals; and digital/analog conversion means for converting the drum speed correction signals from said drum motor control means into analog signals; said digital/analog conversion means having an output connected to an input of said impedance matching means.

In accordance with still another aspect of the present invention, in a capstan servo system for a video cassette recorder, there is provided an apparatus for preventing a picture fluctuation and correcting a reverse pulse, comprising mixing means for mixing a capstan speed control signal and a capstan phase control signal; capstan motor driving means for driving a capstan motor; impedance matching means for matching impedances between said mixing means and said capstan motor driving means; and system control means for controlling an operation of the capstan servo system, said system control means including capstan motor control means for calculating FG pulses from said capstan motor and varying a pulse width of a reverse drive signal to said capstan motor in accordance with the calculated result.

BRIEF DESCRIPTION OF THE DRAWINGS

The above and other objects, features and advantages of the present invention will be more clearly understood from the following detailed description taken in conjunction with the accompanying drawings, in which:

FIGS. 2A to 2E are timing diagrams illustrating a picture fluctuation prevention operation of the conventional apparatus of FIG. 1;

FIGS. 7A to 7D are timing diagrams illustrating a picture fluctuation prevention operation of the apparatus of FIG. 5 in accordance with the present invention; and FIGS. 8A to 8C are timing diagrams illustrating a reverse pulse driving control operation of the apparatus of FIG. 5 in accordance with the present invention.

DETAILED DESCRIPTION OF THE PREFERRED EMBODIMENT

Figure 5:
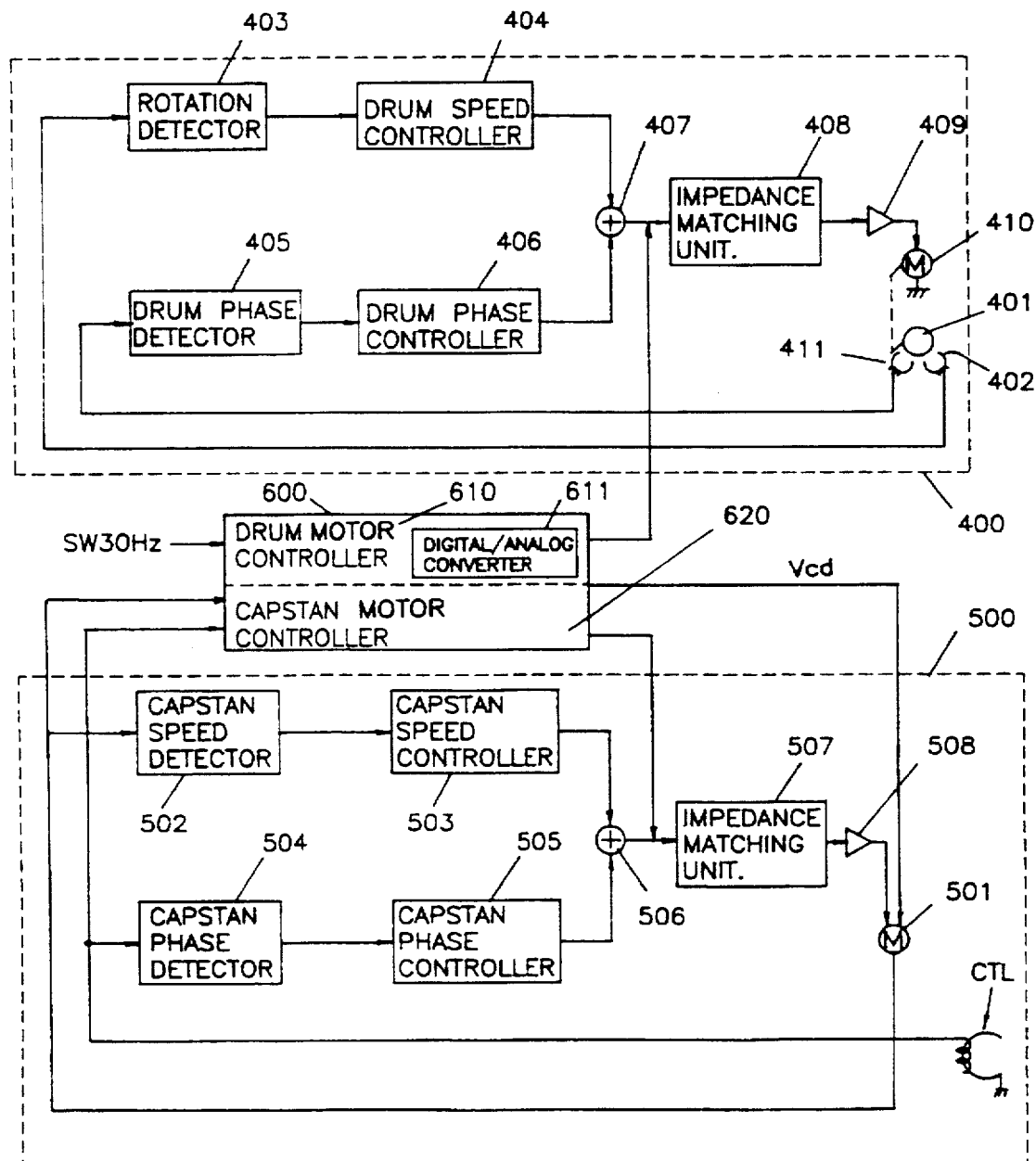
FIG. 5 is a block diagram of an apparatus for preventing a picture fluctuation and correcting a reverse pulse in a VCR in accordance with the present invention.

Referring to FIG. 5, there is shown a block diagram of an apparatus for preventing a picture fluctuation and correcting a reverse pulse in a VCR in accordance with the present invention. As shown in this drawing, the apparatus comprises a drum servo circuit 400, a capstan servo circuit 500 and a control circuit 600.

Figure 1:
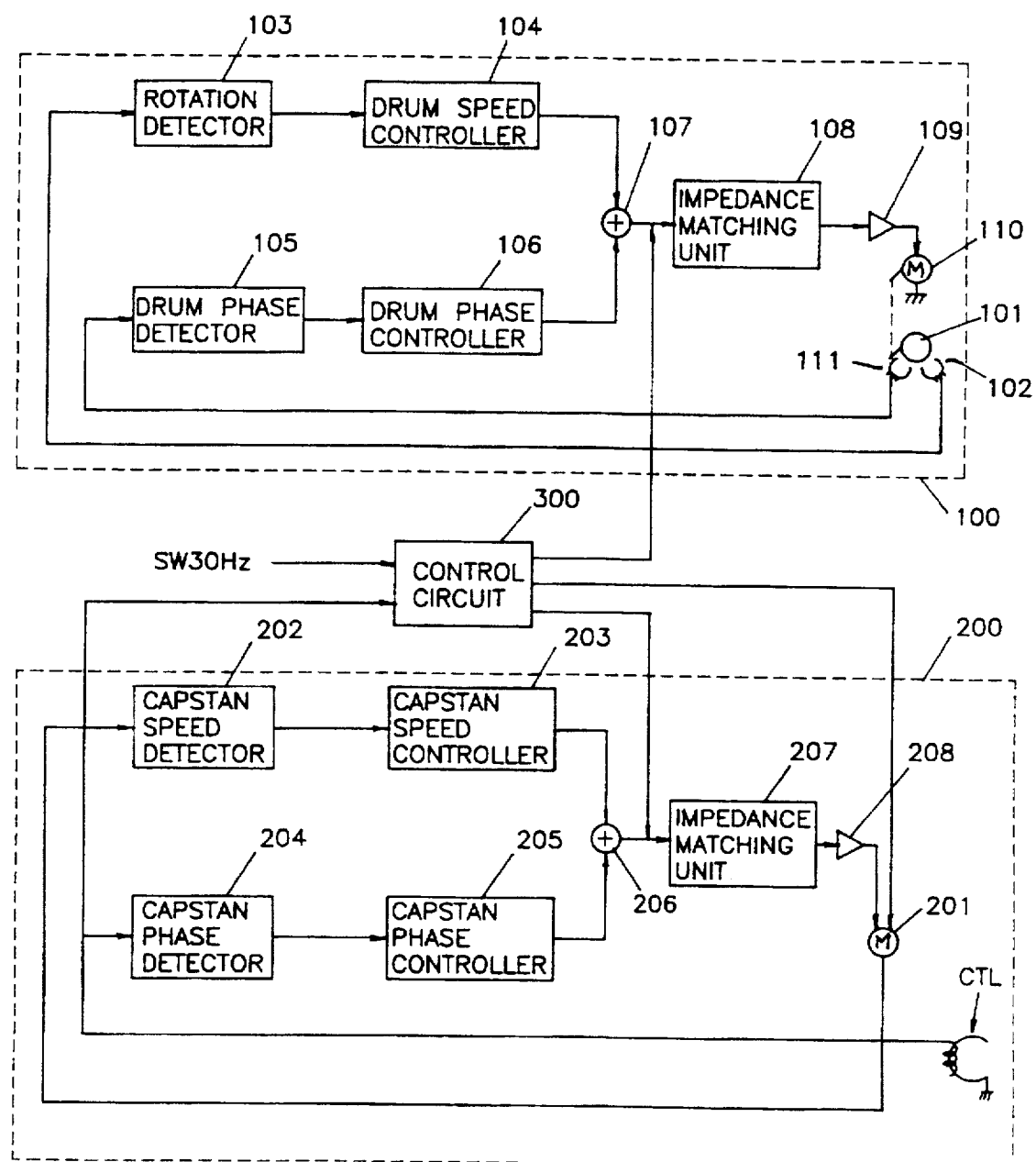
FIG. 1 is a block diagram of a conventional apparatus for preventing a picture fluctuation and correcting a reverse pulse in a VCR.

The drum servo circuit 400 and the capstan servo circuit 500 are the same in construction as the drum servo circuit 100 and the capstan servo circuit 200 in FIG. 1.

The control circuit 600 is provided with a drum motor controller 610 and a capstan motor controller 620. The capstan motor controller 620 is adapted to receive a speed signal detected from a capstan motor 501 for the control of the reverse pulse driving of the capstan motor 501. The drum motor controller 610 includes a digital/analog (D/A) converter 611 to smoothly increase and decrease edges of drum speed correction pulses.

Figure 6:
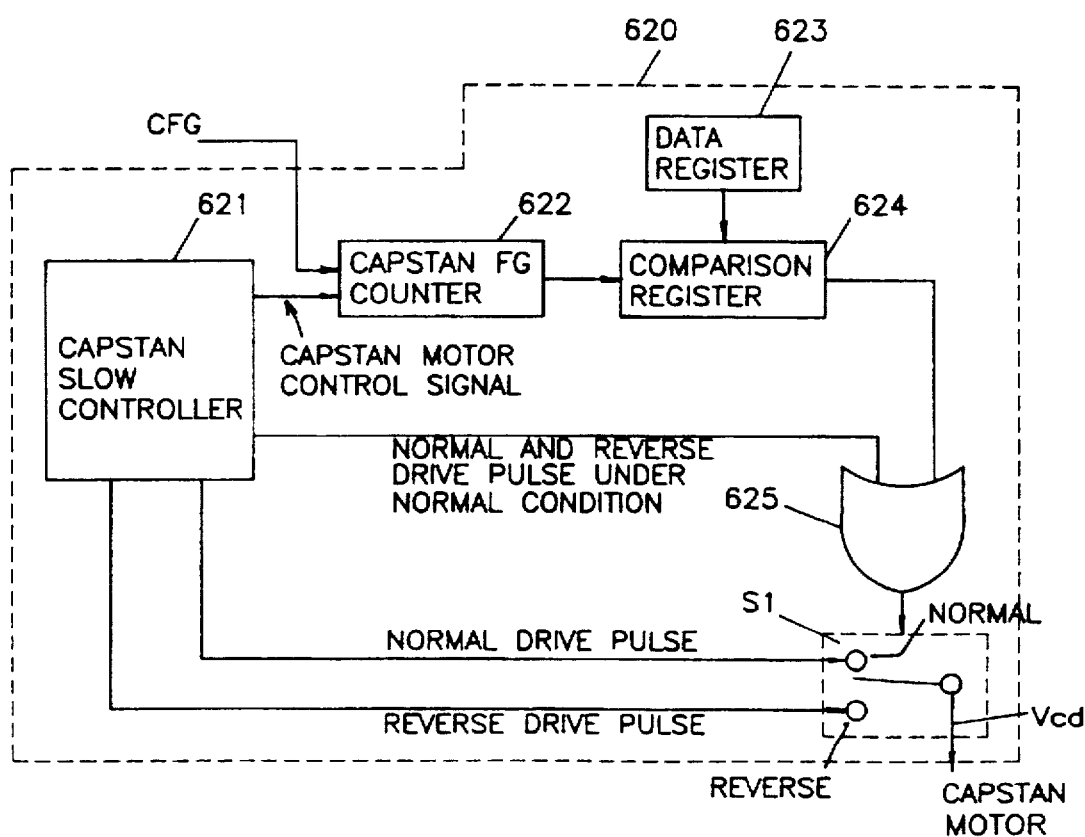
FIG. 6 is a detailed block diagram of a capstan motor controller in FIG. 5 in accordance with the present invention.

Referring to FIG. 6, there is shown a detailed block diagram of the capstan motor controller 620 in FIG. 5 in accordance with the present invention. As shown in this drawing, the capstan motor controller 620 includes a capstan slow controller 621 for controlling a capstan FG counter 622 and applying normal and reverse drive pulses under a normal condition to an OR gate 625. The capstan slow controller 621 is also adapted to apply normal and reverse drive pulses to a switch S1.

The capstan FG counter 622 is adapted to count FG pulses (input CFG) generated with the rotation of the capstan motor 501 in response to a capstan motor control signal from the capstan slow controller 621.

A data register 623 is also provided in the capstan motor controller 620 to store FG pulse values of the capstan motor 501 (standard play (SP):N, long play (LP):N/2 and extended play (EP):N/3, where N is the number of FG pulses per frame) determined in operation modes other than the slow motion mode.

Also, the capstan motor controller 620 includes a comparison register 624 for comparing an output signal from the capstan FG counter 622 with an output signal from the data register 623 and controlling the normal and reverse driving of the capstan motor 501 in accordance with the compared result.

The OR gate 625 is adapted to OR the normal and reverse drive pulses under the normal condition applied from the capstan slow controller 621 and an output signal from the comparison register 624.

The switch S1 is adapted to select one of the normal and reverse drive pulses in response to an output signal from the OR gate 625 and apply the selected drive pulse to the capstan motor 501.

The operation of the apparatus for preventing picture fluctuation and correcting the reverse pulse in the VCR with the above-mentioned construction in accordance with the present invention will hereinafter be described in detail with reference to FIGS. 7A to 8C. FIGS. 7A to 7D are timing diagrams illustrating the picture fluctuation prevention operation of the apparatus of FIG. 5 in accordance with the present invention and FIGS. 8A to 8C are timing diagrams illustrating the reverse pulse driving control operation of the apparatus of FIG. 5 in accordance with the present invention.

For the slow motion playback mode, the capstan motor 501 is repeatedly rotated in such a manner as acceleration→normal→deceleration as shown in FIG. 7A. In this case, there is an error in a relative speed between the capstan motor 501 and a drum motor 410. Upon receiving the drum speed correction pulses from the drum motor controller 610, the D/A converter 611 converts the received drum speed correction pulses into analog signals and outputs the resultant signals to an impedance matching unit 408 in the drum servo circuit 400.

Figure 2B:
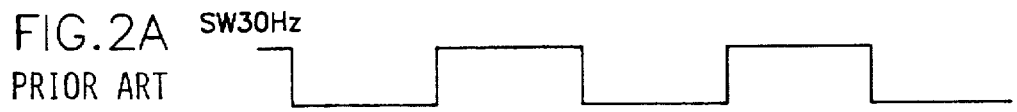
Figure 2B:
Figure 2C:
Figure 2D:
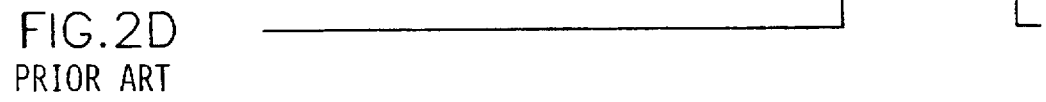
Figure 2E:
Figure 3:
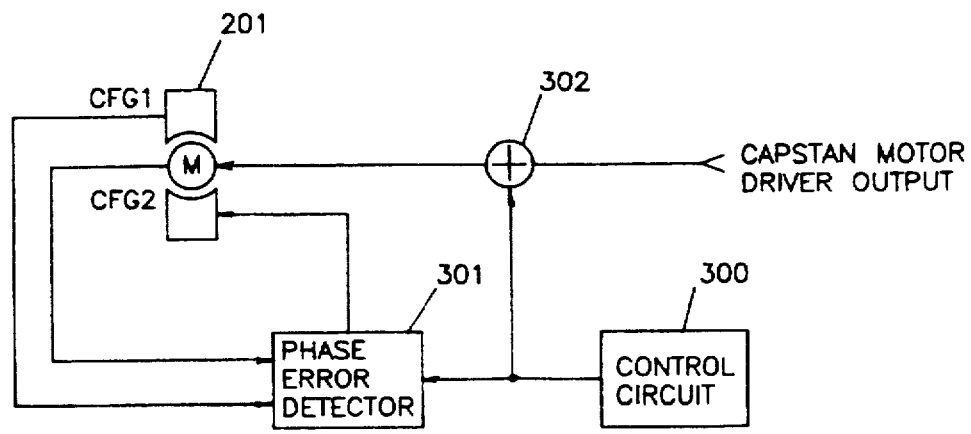
FIG. 3 is a block diagram illustrating a conventional reverse pulse driving control method.
Figure 4A:
FIGS. 4A to 4E are timing diagrams of signals from components in FIG. 3.
Figure 4B:
Figure 4C:
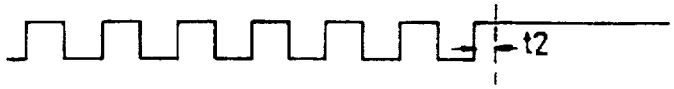
Figure 4D:
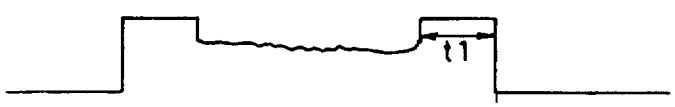
Figure 4E:
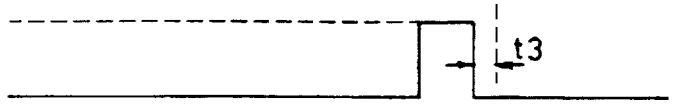

Noticeably, the analog drum speed correction pulses from the D/A converter 611 have waveforms as shown in FIGS. 7B and 7C, which are different from those shown in FIGS. 2C and 2D. Namely, rising and falling edges of the drum speed correction pulses from the D/A converter 611 are not in square waveforms but in gradually increased and decreased waveforms. As a result, the sudden start and stop of a head drum 401 are prevented, resulting in little picture fluctuation in the slow motion playback mode.

Although the rising time t4 and t6 and the falling time t5 and t7 of the drum speed correction pulses may be different according to inertia of the drum motor 410 and a speed and a torque of the capstan motor 501, they can sufficiently be set experimentally. With the picture fluctuation corrected in the above manner, an output signal from the impedance matching unit 408 as shown in FIG. 7D is applied to a drum motor driver 409, thereby causing the drum motor 410 to be rotated.

On the other hand, for the control of the reverse pulse to the capstan motor 501, the capstan FG counter 622 of the capstan motor controller 620 is reset upon receiving an acceleration pulse k1 of the capstan motor control signal from the capstan slow controller 621 as shown in FIG. 8A. Then, the capstan FG counter 622 counts the FG pulses CFG from the capstan motor 501 as shown in FIG. 8B and outputs the resultant value to the comparison register 624. The comparison register 624 compares the counted CFG pulse value from the capstan FG counter 622 with the output value from the data register 623 which stores the values N, N/2 and N/3 determined with respect to the operation modes SP, LP and EP other than the slow motion mode.

Then, the capstan slow controller 621 applies a deceleration pulse k2 of the capstan motor control signal to the capstan FG counter 622 and operates the switch S1 through the OR gate 625 for the control of the reverse driving of the capstan motor 501. As a result, the reverse drive pulse from the capstan slow controller 621 is applied to the capstan motor 501 through the switch S1. Then, the comparison register 624 compares the counted CFG pulse value from the capstan FG counter 622 with the output value from the data register 623. If the values are the same as a result of the comparison, the switch S1 is operated to transfer the normal drive pulse from the capstan slow controller 621 to the capstan motor 501. As a result, the reverse drive pulse to the capstan motor 501 is controlled normally by an interval k3 as shown in FIG. 8C which is a deviation of a stop point due to a slip of the capstan motor 501. Then, the resultant control signal Vcd with the deviation corrected is applied to the capstan motor 501.

As apparent from the above description, according to the present invention, the picture fluctuation can be prevented and the stable picture can be obtained with no noise due to the slip of the capstan motor in the VCR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a capstan servo system for a video cassette recorder having mixing means for mixing a capstan speed control signal and a capstan phase control signal, capstan motor driving means for driving a capstan motor, and inpedance matching means for matching impedances between the mixing means and the capstan motor driving means, an apparatus for preventing picture fluctuation and correcting a reverse drive pulse of the capstan motor driving means in a slow motion playback mode having an acceleration phase, a normal phase and a deceleration phase of the capstan motor, the apparatus comprising:

control means for controlling an operation of the capstan servo system, wherein the control means provides in a slow playback mode drive pulses and reverse drive pulses to the capstan motor driving means, counts capstan frequency generator pulses produced responsive to rotation of the capstan motor, and compares the count value with a predetermined frequency generator (FG) pulse value;

and applying means, during the deceleration phase of the capstan motor, for applying the reverse drive pulses to the capstan motor driving means when the count value and the predetermined FG pulse value are not the same, and applying the normal drive pulses to the capstan motor driving means when the counted value and the predetermined FG pulse value are the same, whereby a pulse width of the reverse drive pulses outputted to the capstan motor driving means is varied in accordance with the comparison result.

2. An apparatus of claim 1, wherein said control means includes:

a capstan slow controller for generating a capstan motor control signal and the normal and reverse drive pulses, a capstan counter, which is reset in response to an acceleration pulse of the capstan motor control signal from said capstan slow controller for counting the capstan frequency generator pulses, a data register for storing the predetermined FG pulse value, a comparison register for comparing the count value from said capstan counter with the predetermined FG pulse value from said data register, and an OR gate for ORing the normal and reverse drive pulses and an output signal from said comparison register; and wherein said applying means includes, a switch for selecting one of the normal drive pulses and the reverse drive pulses in response to an output signal from said OR gate and applying the selected drive pulses to the capstan motor driving means.

3. An apparatus of claim 2, wherein the switch selects the normal drive pulses when the count value from the capstan counter is equal to the predetermined FG pulse value from the data register.

4. An apparatus of claim 1, wherein said control means includes:

a data register for storing the predetermined FG pulse value.

5. An apparatus of claim 4, wherein the predetermined FG pulse value is one of the following:

a predetermined number of FG pulses per frame for a standard player, a predetermined number of FG pulses per frame for a long play, and a predetermined number of FG pulses per frame for an extended play.

6. An apparatus of claim 4, wherein said control means includes:

a logic circuit for ORing the normal and reverse drive pulses and a result from comparing the count value with the predetermined FG pulse value.

7. An apparatus of claim 6, wherein said applying means includes a switch for selecting one of the normal drive pulses and the reverse drive pulses according to an output of the logic circuit.

8. An apparatus of claim 6, wherein the logic circuit includes an OR gate.

9. An apparatus for controlling a servo system of a video cassette recorder during playback, the apparatus comprising:

control means for generating a control signal, a normal drive signal, and a reverse drive signal;

count means for counting frequency generator pulses according to rotation of a capstan motor;

comparison means for comparing the count with a predetermined frequency generator (FG) pulse value and generating a switching signal based on the comparison result and the control signal generated by the control means; and switch means for selecting between the normal drive signal and the reverse drive signal generated by the control means, according to the switching signal, so as to control the capstan motor.

10. An aparatus of claim 9, wherein the comparison means includes:

a data storage for storing the predeterimined FG pulse value, a comparison circuit for comparing the count with the predetermined FG pulse value and outputting the comparison result, and a logic circuit for performing a logic operation on the control signal and the comparison result to generate the switching signal.

11. An apparatus of claim 10, wherein the logic circuit includes an OR gate such that, when the count is compared to be the same as the predetermined FG pulse value, the switch means selects the normal drive signal.

12. An apparatus of claim 11, wherein, when the count is compared to be different from the predetermined FG pulse value, the switch means selects the reverse drive signal.

13. An apparatus of claim 9, wherein the predetermined FG pulse value is one of the following:

a number of frequency generator pulses per frame for a standard play, a number of frequency generator pulses per frame for a long play, and a number of frequency generator pulses per frame for an extended play.

14. An apparatus of claim 9, further comprising:

capstan detector means for detecting a speed and phase of the capstan motor;

capstan controlling means for controlling the speed and the phase of the capstan motor in response to output signals from the captsan detector means;

mixer means for mixing output signals from the capstan controlling means; and impedance matching means for matching an impedance of an output signal of the mixer means with an impedance of an output signal of a capstan motor controller so as to control the capstan motor.

15. A method of controlling a servo system of a video cassette recorder during a playback, the method comprising the steps of:

generating a control signal, a normal drive signal, and a reverse drive signal;

counting frequency generator pulses according to rotation of a capstan motor;

comparing the count with a predetermined frequency generator (FG) pulse value and generating a switching signal based on the comparison result and the control signal; and selecting between the normal drive signal and the reverse drive signal generated by a control unit, according to the switching signal, so as to control the capstan motor.

16. A method of claim 15, wherein the comparing step includes the steps of:

storing the predeterimined FG pulse value in a data register, comparing the count with the predetermined FG pulse value and outputting the comparison result, and performing a logic operation on the control signal and the comparison result to generate the switching signal.

17. A method of claim 15, wherein the selecting step includes the steps of:

selecting using an OR gate, the normal drive signal when the count is compared to be the same as the predetermined FG pulse value, and selecting using the OR gate, the reverse drive signal when the count is compared to be different from the predetermned FG pulse value.

18. A method of claim 15, wherein the comparing step includes the step of:

storing in a data register the predetermined FG pulse value, wherein the predetermined FG pulse value is one of the following:

a number of frequency generator pulses per frame for a standard play, a number of frequency generator pulses per frame for a long play, and a number of frequency generator pulses per frame for an extended play.

* * * * *